United States Patent
Doherty et al.

(10) Patent No.: US 7,233,427 B2
(45) Date of Patent: Jun. 19, 2007

(54) DISPLAY SYSTEM WITH CLOCK DROPPING

(75) Inventors: Donald B. Doherty, Richardson, TX (US); Daniel J. Morgan, Denton, TX (US)

(73) Assignee: Texas Instruments Incorporated, Dallas, TX (US)

(*) Notice: Subject to any disclaimer, the term of this patent is extended or adjusted under 35 U.S.C. 154(b) by 0 days.

(21) Appl. No.: 11/391,015

(22) Filed: Mar. 28, 2006

(65) Prior Publication Data

US 2006/0187519 A1 Aug. 24, 2006

Related U.S. Application Data

(62) Division of application No. 10/458,045, filed on Jun. 10, 2003, now Pat. No. 7,019,881.

(60) Provisional application No. 60/387,857, filed on Jun. 11, 2002.

(51) Int. Cl.
*G02F 1/03* (2006.01)
*G02F 1/00* (2006.01)
*H04N 9/12* (2006.01)
*H04N 5/71* (2006.01)

(52) U.S. Cl. .................. 359/245; 348/743; 348/771

(58) Field of Classification Search ............... 359/245, 359/249, 449; 348/743, 771, 756, 536, 270, 348/655–658; 345/589, 592, 108, 690–693; 250/233

See application file for complete search history.

(56) References Cited

U.S. PATENT DOCUMENTS

| 5,061,049 A | 10/1991 | Hornbeck |
| 5,126,639 A * | 6/1992 | Srivastava .................. 315/364 |
| 5,280,277 A | 1/1994 | Hornbeck |
| 5,612,753 A | 3/1997 | Poradish et al. |
| 5,706,061 A * | 1/1998 | Marshall et al. ............ 348/743 |
| 5,774,196 A * | 6/1998 | Marshall ..................... 348/743 |
| 5,905,545 A | 5/1999 | Poradish et al. |
| 5,912,712 A | 6/1999 | Doherty |
| 6,084,235 A * | 7/2000 | Breithaupt et al. ......... 250/233 |
| 6,591,022 B2 | 7/2003 | Dewald |
| 6,738,104 B2 * | 5/2004 | Marshall ..................... 348/743 |
| 6,911,963 B2 * | 6/2005 | Baba et al. .................. 345/88 |
| 2003/0227465 A1 | 12/2003 | Morgan et al. |

* cited by examiner

*Primary Examiner*—Loha Ben
(74) *Attorney, Agent, or Firm*—Charles A. Brill; Wade James Brady, III; Frederick J. Telecky, Jr.

(57) ABSTRACT

A display system includes a light source 110 and a spatial light modulator 122 located to receive light from the light source. The spatial light modulator (e.g., a DMD) includes a number of independently controllable elements that are activated for a period of time to display light of a desired brightness. A light sensor 136 is located to determine a characteristic of light from the light source 110. A control circuit 126 is coupled to the spatial light modulator 122 and controls the period of time that the independently controllable elements are activated. This period of time is based at least in part by an input received from the light sensor 136.

7 Claims, 6 Drawing Sheets

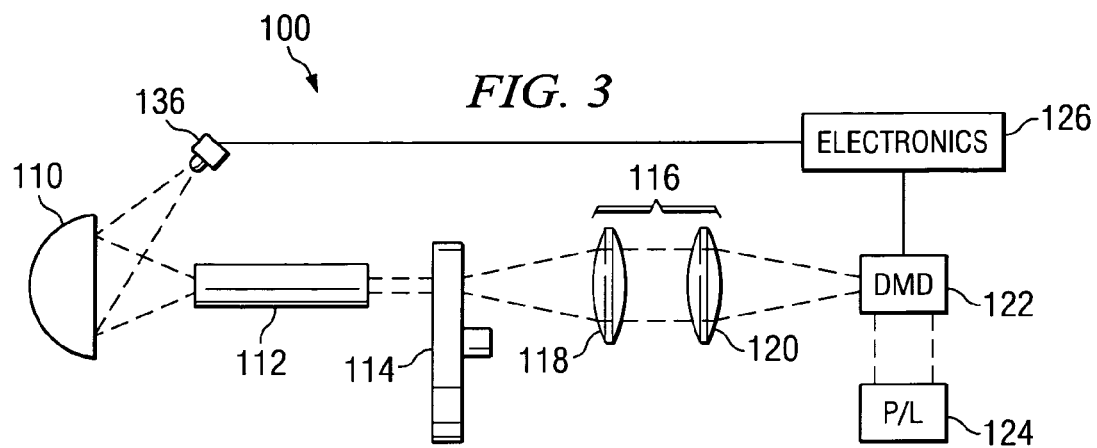
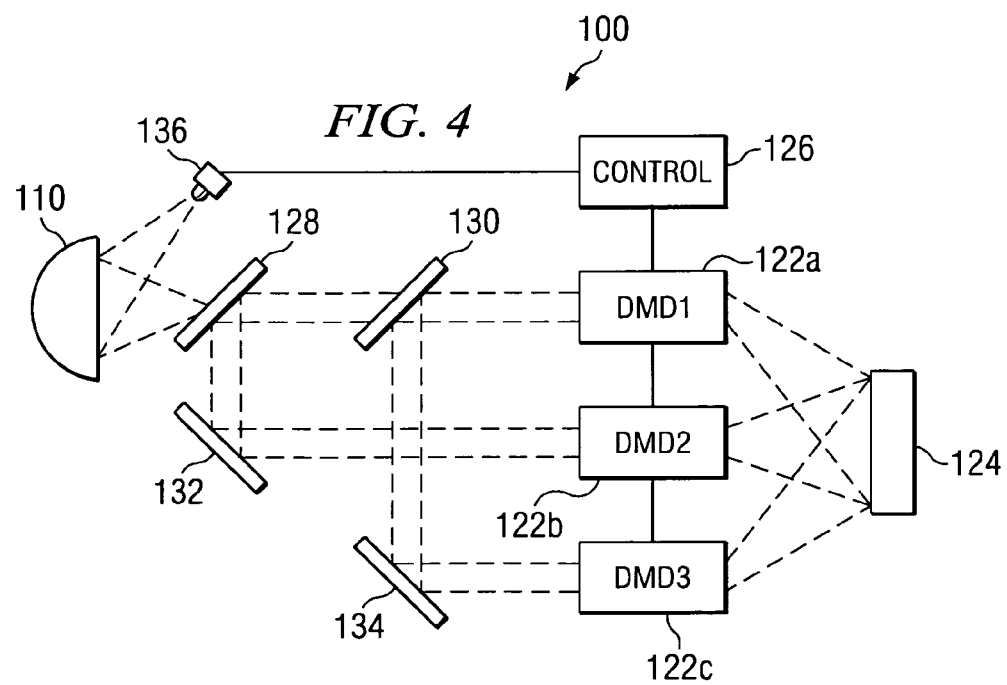

DISPLAY SYSTEM WITH CLOCK DROPPING

This application is a divisional of application Ser. No. 10/458,045, filed Jun. 10, 2003, now U.S. Pat. No. 7,019,881, which claims the benefit of provisional application Ser. No. 06/387,857, filed Jun. 11, 2002.

CROSS-REFERENCE TO RELATED APPLICATIONS

This application relates to the following co-pending and commonly assigned patent applications:

| Patent or Ser. No. | Filing Date | Issue Date |
|---|---|---|
| 6,591,022 | Dec. 21, 2001 | Jul. 8, 2003 |
| 7,061,512 | Jun. 10, 2003 | Jun. 13, 2006 |
| 5,912,712 | May 11, 1998 | Jun. 15, 1999 |

TECHNICAL FIELD

The present invention relates generally to display systems and the preferred embodiment relates to a display system with clock-dropping to compensate for lamp variations.

BACKGROUND

One technology that is used for display systems is based on a digital micromirror device or DMD. Such systems are commercially available from Texas Instruments, Inc. under the trademark DLP™ (Digital Light Processing). Referring to FIG. 1, an example of a DMD system 10 is illustrated, wherein the light from a light source 11 is applied through a first condenser lens 13 and through a color wheel 15, which will typically rotate at least once per frame of the image to be displayed. The light passing through the color wheel 15 passes through a second condenser lens 17 onto a DMD chip 19. The DMD chip includes an array (on the order of one million) of tiny mirror elements, or micro-mirrors, where each mirror element is hinged by a torsion hinge and support post above a memory cell of a CMOS static RAM as shown in FIG. 2.

FIG. 2 shows a portion of a typical DMD array 19 having mirror elements 21 suspended over a substrate 23. Electrostatic attraction between the mirror 21 and an address electrode 25 causes the mirror to twist or pivot, in either of two directions, about an axis formed by a pair of torsion beam hinges 27a and 27b. Typically, the mirror rotates about these hinges until the rotation is mechanically stopped. The movable micro-mirror tilts into the on or off states by electrostatic forces depending on the data written to the cell. The tilt of the mirror is on the order of plus 10 degrees (on) or minus 10 degrees (off) to modulate the light that is incident on the surface. For additional details, see U.S. Pat. No. 5,061,049 entitled "Spatial Light Modulator" and U.S. Pat. No. 5,280,277 entitled "Field Updated Deformable Mirror Device," both by Larry J. Hornbeck.

Referring again to FIG. 1, the light reflected from any of the mirrors may pass through a projection lens 29 and create images on the screen 31. The DMD's are controlled by electronic circuitry fabricated on the silicon substrate 23 under the DMD array. The circuitry includes an array of memory cells, typically one memory cell for each DMD element, connected to the address electrodes 25. The output of a memory cell is connected to one of the two address electrodes and the inverted output of a memory cell is connected to the other address electrode.

Data is provided by a timing and control circuit 33 determined from signal processing circuitry and an image source indicated at 35. Once data is written to each memory cell in the array, a voltage is applied to the DMD mirrors 21 creating a large enough voltage differential between the mirrors 21 and the address electrodes 25 to cause the mirror to rotate or tilt in the direction of the greatest voltage potential. Since the electrostatic attraction grows stronger as the mirror is rotated near an address electrode, the memory cell contents may be changed without altering the position of the mirrors once the mirrors are fully rotated. Thus, the memory cells may be loaded with new data while the array is displaying previous data.

The intensity of each color displayed on the screen 31 is determined by the amount of time the mirror 21 corresponding a particular pixel directs light toward screen 31. For example, each pixel may have 256 intensity levels for each color (e.g., red, green or blue). If the color level selected for a particular pixel at a particular time is 128, then the corresponding mirror would direct light toward that area of screen 31 for ½ (e.g., 128/256) of the frame time.

SUMMARY OF THE INVENTION

In one aspect, the present invention provides a way to compensate for variations in the lamp intensity. For example, when light source 11 (FIG. 1) is an AC arc lamp, the light intensity output by the lamp will not be constant. The preferred embodiment provides a way to compensate for these variations. This compensation method can be used in systems that use DMDs as well as other spatial light modulator such as liquid crystal displays (LCDs), Actuated Mirror Arrays™, grating light valves, and plasma display panels.

In accordance with a preferred embodiment of the present invention, a display system includes a light source and a spatial light modulator located to receive light from the light source. The spatial light modulator (e.g., a DMD) includes a number of independently controllable elements that are activated for a period of time to display light of a desired brightness. A light sensor is located to determine a characteristic of light from the light source. A control circuit is coupled to the spatial light modulator and controls the period of time that the independently controllable elements are activated. This period of time is based at least in part by an input received from the light sensor.

A spatial light modulator receives light from the color wheel and directs modulated light to a display. A memory device provides the image data to the spatial light modulator. An integrated circuit is coupled to the spatial light modulator to control the timing and duration of light directed from the spatial light modulator to the display. The integrated circuit receives information from the light sensor, e.g., to help determine the timing and duration.

The present invention also includes a method of displaying pixel data. Image data is received. An activation duration for each element in a spatial light modulator element is determined based upon the received image data. A characteristic of light used to display the pixel data is measured and the activation duration is modified based upon the measured characteristic. The spatial light modulator elements are then activated for the modified duration.

BRIEF DESCRIPTION OF THE DRAWINGS

For a more complete understanding of the present invention, and the advantages thereof, reference is now made to the following descriptions taken in conjunction with the accompanying drawing, in which:

FIG. 3 is a first embodiment system of the present invention;

FIG. 4 is a second embodiment system of the present invention;

DETAILED DESCRIPTION OF ILLUSTRATIVE EMBODIMENTS

Figure 1:
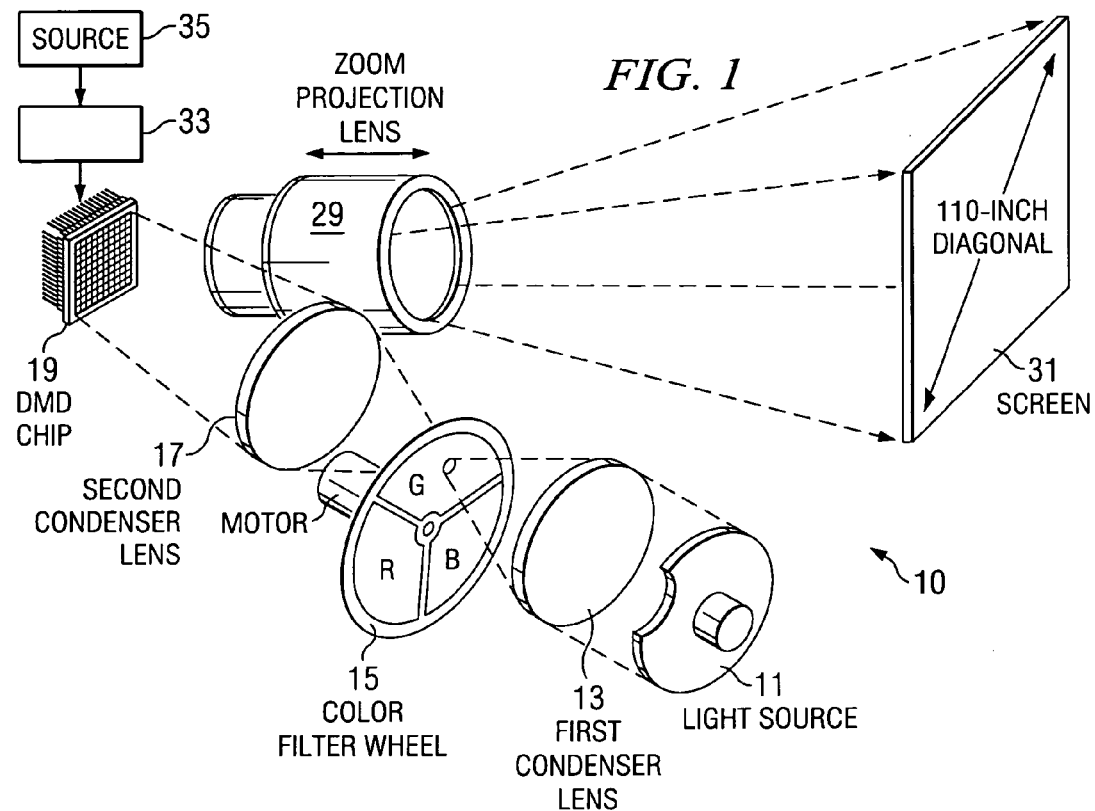
FIG. 1 is a block diagram of a conventional DMD-based display system.
Figure 2:
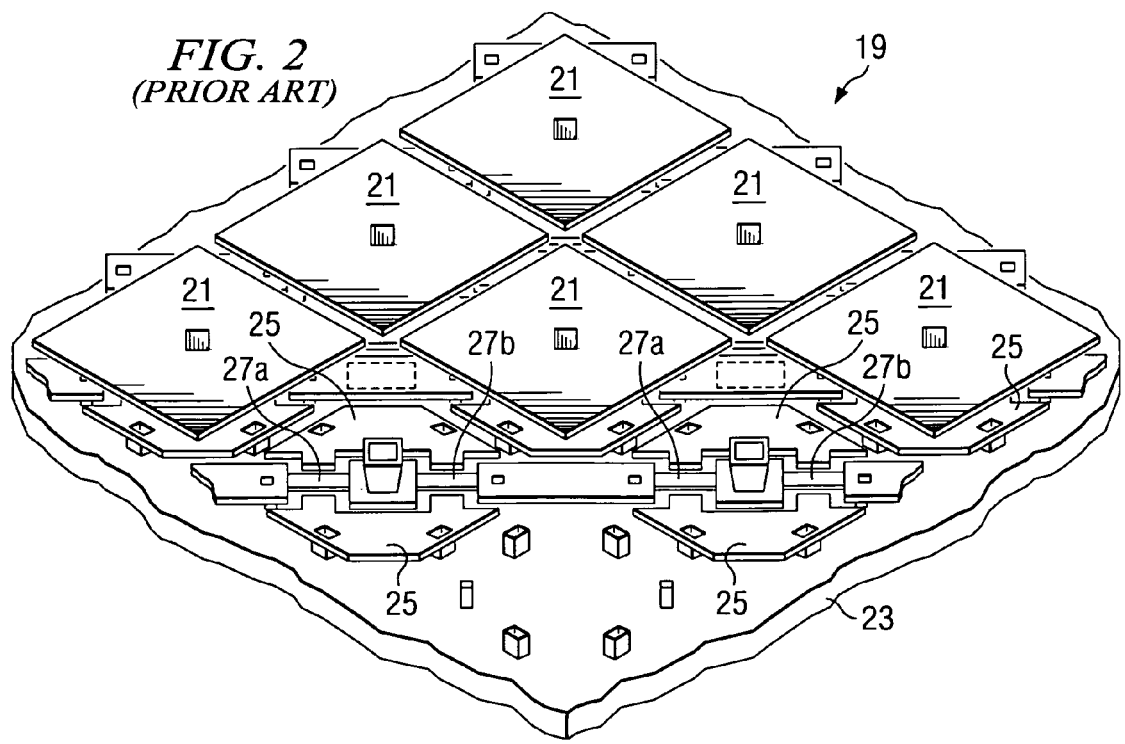
FIG. 2 is a view of an array of DMD mirrors.

The making and using of the presently preferred embodiments are discussed in detail below. It should be appreciated, however, that the present invention provides many applicable inventive concepts that can be embodied in a wide variety of specific contexts. The specific embodiments discussed are merely illustrative of specific ways to make and use the invention, and do not limit the scope of the invention.

FIG. 3 shows a basic display system 100 that can utilize aspects of the present invention. System 100 includes a light source 110, such as an arc lamp. The light source preferably generates a full spectrum of visible light. This light is transmitted to an integrator rod 112, which provides the light to color wheel 114. Light of the desired color is then provided to optics portion 116. In this illustration, the optics portion is shown to include a first lens 118 and a second lens 120. Other optics could alternatively be used.

The light is then transmitted to DMD 122. The light from the DMD 122 is provided to projection lens 124, where it can be focused for visual display. The DMD 122 is controlled by control electronics labeled 126. This block 126 provides the image data and the control signals that drive the DMD 122.

The preferred embodiment of the present invention is described herein with respect to a DMD-based display system. In other words, the spatial light modulator 122 is implemented using at least one DMD device. In other embodiments, the spatial light modulator 122 could be liquid crystal cells, Actuated Mirror Arrays™, grating light valves, and plasma display panels.

FIG. 4 provides an example system that includes three DMD devices 122a, 122b, and 122c (collectively referred to as 122). In this example, light emitted from light source 110 is split by optics so that a single color is emitted to each DMD 122. For example, DMD 122a can receive red light while DMD 122b receives blue light and DMD 122c receives green light. This splitting is accomplished by color-splitting prisms 128 and 130 and mirrors 132 and 134.

The present invention could also be implemented in a system that includes two spatial light modulators. Such a system is described in U.S. Pat. No. 5,612,753 and U.S. Pat. No. 5,905,545, both of which are incorporated herein by reference.

The embodiments of FIGS. 3 and 4 both include a light sensor 136. The light sensor 136 measures the intensity of light being emitted from light source 110 and provides an indication of the results of this measurement to electronics block 126. As will be described in greater detail below, the electronics block 126 can vary the signals provided to DMD 122 to compensate for variations in the light emitted from the light source 122.

In the illustrated embodiments, sensor 136 is located adjacent light source 110. In this embodiment, the sensor will measure the intensity of "white" light. In other embodiments, the sensor 136 can measure the intensity of each of the colored light (e.g., red, green, blue) separately. For example, the sensor 136 could be placed between the color wheel 114 and the DMDs 122 in the example of FIG. 3. In another example, three sensors could be used with the embodiment of FIG. 4. Each of these sensors would measure light going to one of the DMDs 122.

Figure 5:
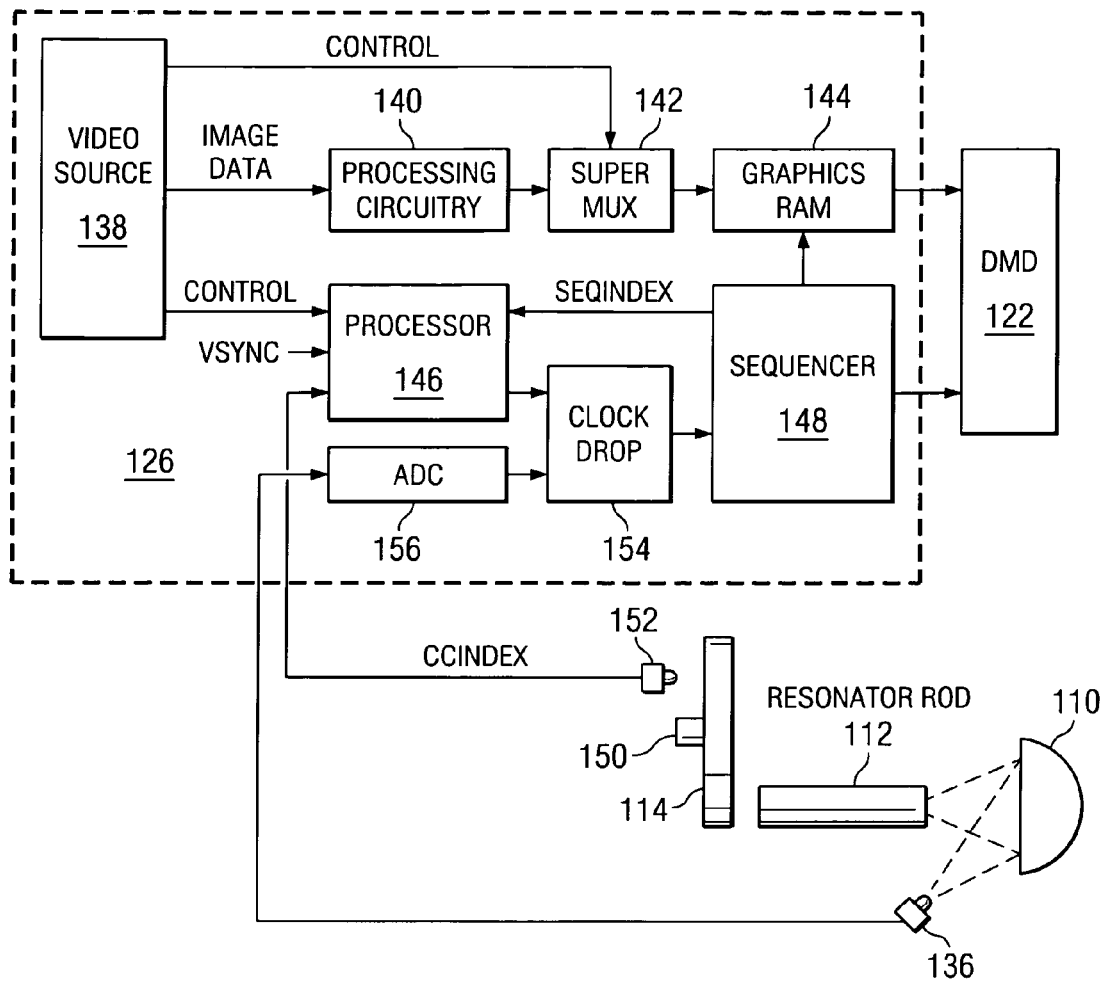
FIG. 5 is a more detailed view of the system of FIG. 3.

FIG. 5 shows a block diagram of electronics 126 that drive the system 100 of FIG. 3. Further details of a particular embodiment are described in co-pending application Ser. No. 10/458,408, now U.S. Pat. No. 7,061,512 entitled "Constant-Weight Bit-Slice PWM Method and System for Scrolling Color Display Systems," which application is incorporated herein by reference.

Referring now to FIG. 5, the system 126 includes a video source 138. In the preferred embodiment, this source provides digital RGB video or graphics. This information could have been received from any of a number of places including a computer, a set-top box for cable or satellite television, a television antenna or many other sources. The signals provided to video source 138 can be either analog or digital. If an analog signal is received by system 126, the digital video source 138 would likely include an analog-to-digital converter.

Video source 138 provides image data to processing circuitry 140. The processing circuitry 140 will process the data to put it in the proper format and/or to otherwise modify characteristics of the image to be displayed. Specific examples of processing circuitry include digamma circuitry, color hue correction circuitry, secondary color boost/spoke light recapture circuitry, blue noise spatial temporal multiplexing (STM) circuitry, and noise-free boundary dispersion circuitry. If the video source 138 provides analog image data, then the processing circuitry 140 would also include an analog-to-digital converter.

The image data from the processing circuitry 140 is provided to a data arranger 142, which can be referred to as a SuperMux. The SuperMux 142 arranges the pixel data in the proper patterns to be displayed by the DMD 122. In one embodiment, the DMD 122 displays multiple colors at any given time. One function of the SuperMux 142 is to rearrange this data so that DMD 122 is configured to display the proper colors at the proper times.

Graphics RAM 144 receives the image data from the SuperMux 142 and provides this data to the DMD 122. The graphics RAM 144 is preferably a dynamic random access memory array. For example, graphics RAM 144 can be a double data rate synchronous random access memory.

Video source 138 also provides control signals to SuperMux 142 and processor 146. Processor 146 may be a microprocessor or other processing circuit that manipulates the timing and other control signals. Processor 146 is coupled to sequencer 148, which controls timing of the rotation of the DMD mirrors. In the preferred embodiment, sequencer 148 is a specialized processor that executes code to control the on-times of the various mirrors to generate the bit weights. The sequencer 148 also comprehends the three colors. Further details of the sequencer timing will be described below.

The system 126 has been illustrated to include six functional blocks (plus DMD 122). It is understood, however, that the delineation of particular functions is somewhat arbitrary and that each of these functions could be performed in one or more different integrated circuits. The functional blocks are labeled here for purposes of illustration and several of the functions can be combined or separated in various circuits or other functional units.

One type of display system uses a single DMD 122 with the illumination light applied in a color sequential manner (called field-sequential-color or FSC). A rotating color wheel 114 is typically used. Light is applied as red (R) then green (G) then blue (B) (or any other order) with each color sequentially applied so that the color completely fills the DMD. In another system, scrolling color (SC) optics are used. In this system, multiple colors (e.g., red, green, blue and white) are displayed simultaneously, with bands of each color "scrolling" down (or up) the display.

In FSC projectors, the color wheel motor 150 is frequency and phase locked to the frame rate of the image data. The motor frequency will typically not run at the same frequency as the frame rate but rather at a fixed percentage higher (e.g., 2× faster or 1.5× faster). As the frame rate varies a control loop will vary the motor speed to keep the wheel 114 synchronized to the frame rate. For minimal artifact operation this must also be done for SC display systems. For example, a 60 Hz frame rate may cause the wheel 114 to spin at 90 Hz where the motor frequency is locked at one and a half times the frame rate. Assuming 3× operation, and wheel physical segments of GWBRGWBR, then the wheel 114 rotates 1.5 times per frame so that the DMD 122 sees three full sets of colors per frame.

As the frame rate varies the wheel speed will vary. For example at 62 Hz frame rate the wheel speed changes to 93 Hz. With FSC systems a set of sequences exist that are divided into wheel rate frequency bins. The bins are typically spaced 4 Hz apart. The sequence for the bin that the frame rate is in is then used for pulse width modulation (PWM) by the sequencer 148. Any undershoot in the sequence execution time, meaning the sequence is running too fast, is removed by clock dropping.

In FSC systems the sequence executes over one rotation of the wheel 114 and then it goes briefly idle and waits to be restarted. The restart occurs when a signal CCINDEX from the position sensor 152 at the color wheel 114 is toggled indicating the wheel 114 is at its starting position. However, even with clock dropping there are still errors in the duration of the sequence. For example, if motor jitter causes the wheel 114 to slow down slightly for one rotation then the sequence will be completed early. With this uncertainty at the end of each sequence, the sequence is typically written so that it will complete early and then go idle. This technique prevents a restart of a sequence before it has completed. These idle times due to the uncertainty at the end of each sequence are taken up with "hanging bits." Hanging bits can vary slightly in duration without creating significant artifacts. These bits will keep the mirrors in their current state until the sequence is restarted.

With the FSC approach, the idle time at the end of a sequence is variable. It is variable because there is jitter in the restart signal. However, with SC operation no hanging bits are possible. Since all colors and most bits are being displayed at any given time on the DMD 122, the bit on-times cannot be stretched with hanging bits to take up the variable idle time at the end of a color cycle. Therefore, with the preferred embodiment of this invention, the sequence will "free run" at all times and no variable idle times will exist at the end of the sequence. At the completion of a color cycle, the sequence will simply continue to run into the next color and no restart signal is used.

With the preferred embodiment of this invention, the duration of the sequence is controlled by clock dropping that adjusts the sequence time length to fit into each color cycle within a frame. In this manner, errors in wheel speed with respect to VSYNC are spread out over the entire frame so that no single bit-slices have an error significant enough to cause noticeable artifacts. This overall sync approach must be used because otherwise hanging bit times at end of sequences would cause fixed-pattern bit-slice artifacts for the affected bit-slices with extended on-times.

Thus clock dropping is used to fit the sequence time duration to optimally fit into the three color cycles that occur in one video input frame. A sequencer control loop controls the sequence duration to match the wheel speed. A separate control loop is used to lock the wheel 114 to VSYNC. The sequence duration does track the frame rate but through the indirect route of tracking the wheel speed. Since the wheel 114 is what actually applies the color bands to the DMD 122, it makes sense for the clock dropping settings to be based on the wheel speed and not the frame rate. The clock dropping value can be updated by the control processor 146 every time the color cycle index (CCINDEX) signal toggles as received from the wheel position sensor.

The sequencer 148 speeds up or slows down so that the sequence tracks the wheel frequency and phase. Since any errors in sequence duration cause the DMD 122 loading and resetting to be out of phase with the wheel 114, clock dropping is preferably very high resolution (e.g., able to drop 1 out of very 500 clocks) to make the small corrections needed to maintain very precise phase lock. Any mismatch in sequence duration means that the spoke regions of the wheel will be enlarged, when writing a sequence, since the uncertainty in the spoke position means that larger areas of the DMD may have mixed-color light on them. Larger spokes means more white peaking meaning a smaller white segment must be used. A smaller white segment means less screen lumens so it is important to have high resolution on clock dropping.

The sequencer 148 operation free runs and syncing is purely done with clock dropping under microprocessor 146 control. The microprocessor 146 compares the phase of CCINDEX to signal SEQRNDEX, which is output by the free running sequencer 148, and adjusts clock-dropping circuit 154 to phase lock the sequence. Short/long sequence underrun/overrun errors are ignored by the sequencer operation and errors are absorbed into spoke sizes as additional wheel position error jitter. A small impact on spoke size is unavoidable.

Thus there are two control loops used to implement this aspect of the present invention. The first control loop is the same one used in FSC systems, which locks the motor CCINDEX signal to VSYNC. In FSC systems then CCINDEX asynchronously resets the sequence once per wheel rotation and no additional control loops are needed. However, with this embodiment of the invention a second control loop is used that locks SEQRNDEX to CCINDEX via clock dropping as described above.

The preferred embodiment of this invention also uses clock dropping in a very useful way—to compensate for the AC lamp light transient that occurs at each current commutation. One result of using clock dropping is that the resetto-reset times are variable depending on the clock dropping setting. When clock dropping is increased, when the motor slows down, then the reset-to-reset times are stretched as the sequence duration maintains a constant relationship to the wheel speed. This means that the bit on-times of the bits being displayed are all altered. Also, when the reset-to-reset times are slowed down then the bit-slice stepping speed also slows down.

The AC lamp commutation light transient creates fixed-pattern artifacts in the shape of the bit-slices (e.g., curved and/or rectangular). The light transient brightens or darkens the active bit-slices, for a particular image, that are applied to the DMD 122 during the light transient. Which bit-slices are brightened or darkened is graycode dependent.

Figure 6:
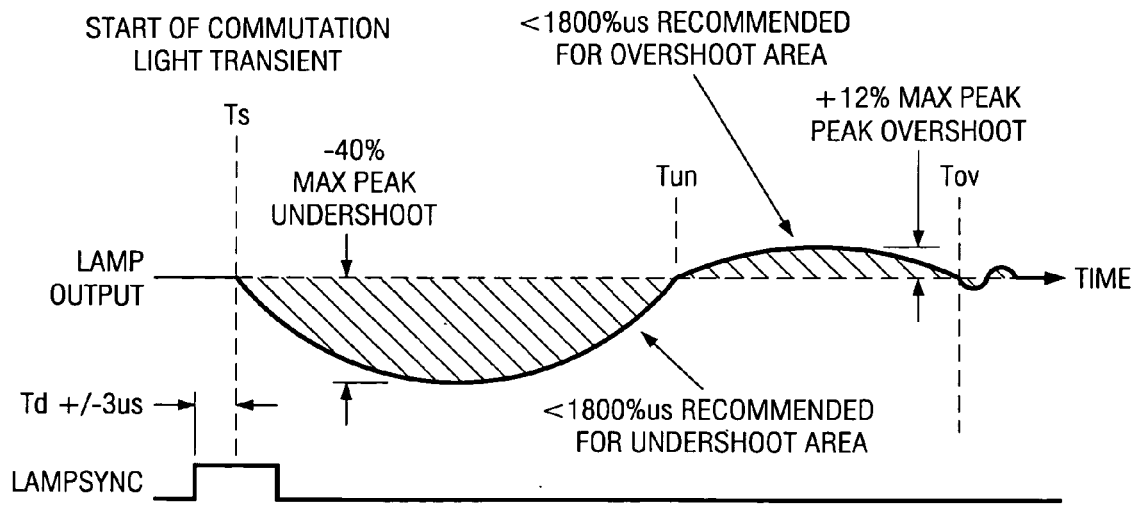
FIG. 6 shows an example of a transient waveform from an AC lamp.

FIG. 6 shows an exemplary light transient for an AC lamp 110. The time $T_S$ indicates the start of the commutation light transient. This start was triggered by a lamp synchronization signal lamp sync. The light signal has an undershoot specified to be no more than 40% between time $T_S$ and time $T_{UN}$ and then overshoot specified to be no more than 12% between time $T_{UN}$ and time $T_{OV}$. The clock dropping speeds up or slows down all timing events that affect the displayed bit-slices so that integrated light is constant for each bit-slice.

With this embodiment of the invention, the light sensor 136 is used to measure the intensity of white light coming from the lamp 110 during the light transient. The light transient is then digitized using an ADC 156 and continuous samples are taken during the light transient. This data can then be used to adjust the on-times of bit-slices used with this embodiment so that any bit weight errors due to the light transient are compensated.

On-times of bit-slices are corrected in this embodiment using an advanced form of clock dropping. Clock dropping is used so that the stepping speed (or scrolling speed) of the bit-slices is slowed down or speeded up when the transient occurs. Any change in stepping speed directly changes the on-time for the active bit-slices. For example, if a light reduction occurs at the start of the transient then the reset-to-reset time interval can be increased so that the bit-slice stepping can pause for a longer period until the integrated light intensity during the current stepping position is the same as stepping positions when no light transient occurred. Likewise, if during part of the transient the light is greater than the lamp overall average light output, then the stepping speed can be increased to shorten bit on-times.

Thus this new clock-dropping scheme adjusts bit on-times for bits that are being displayed during the lamp light transient. Clock dropping does real-time correction of bit-slice weights during the light transient. This is different from prior art FSC projectors that use clock dropping to only correct sequence duration over a full wheel rotation. With the preferred embodiment invention, on-times of all active bit-slices on the DMD have their weights compensated. Thus no fixed-pattern artifacts are generated during the transients.

So clock dropping in the preferred embodiment of this invention is used for both compensating for the AC lamp light transients and also for phase locking the free-running sequence to the color wheel as described earlier. Further details of a specific embodiment of the clock dropping embodiments will now be described. These details provide one example of a specific implementation, which will be described with reference to FIGS. 6, 7, and 8.

Figure 7:
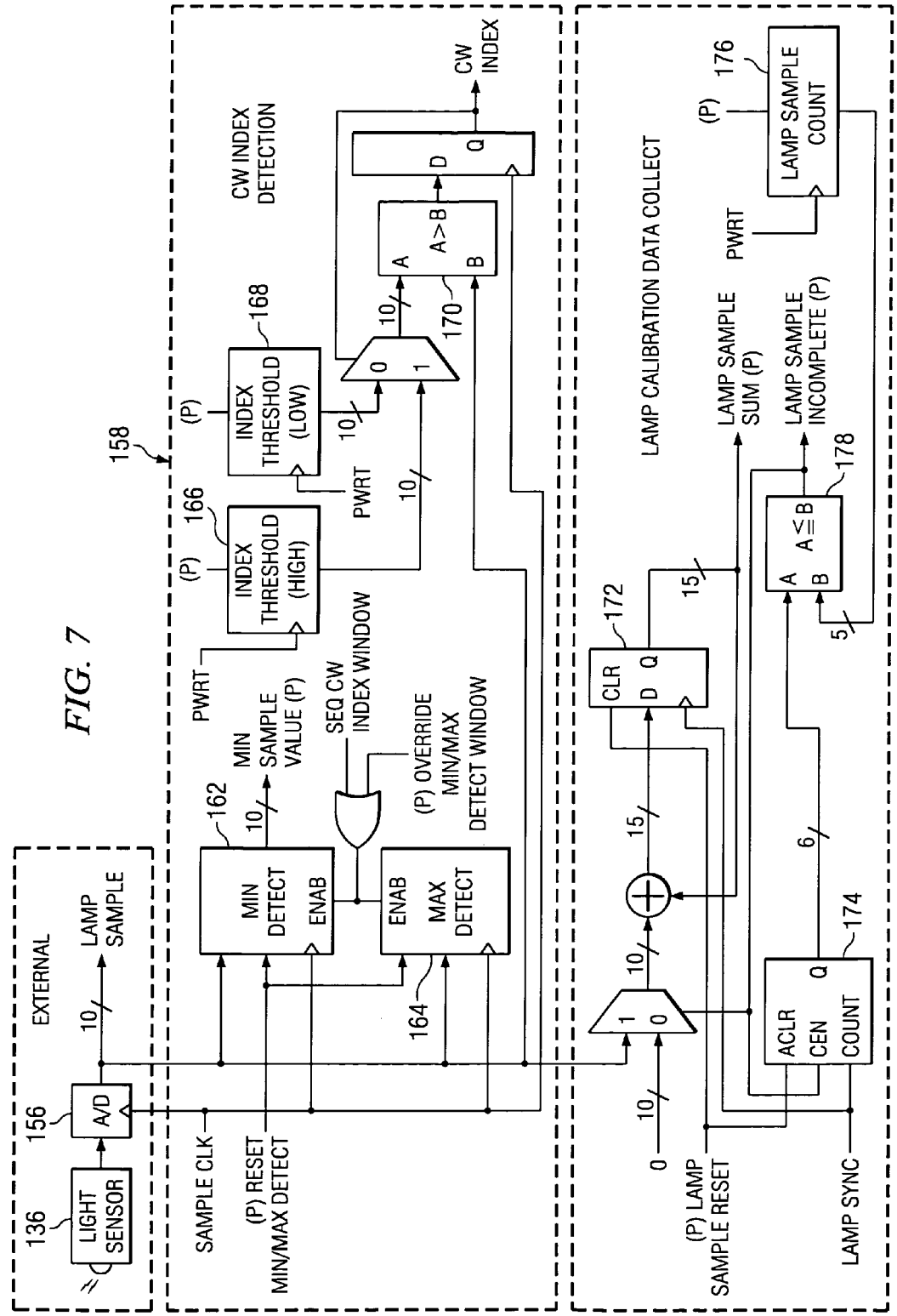
FIGS. 7 and 8 provide details of an exemplary implementation of the clock-dropping scheme of the preferred embodiment of the present invention.
Figure 8A:
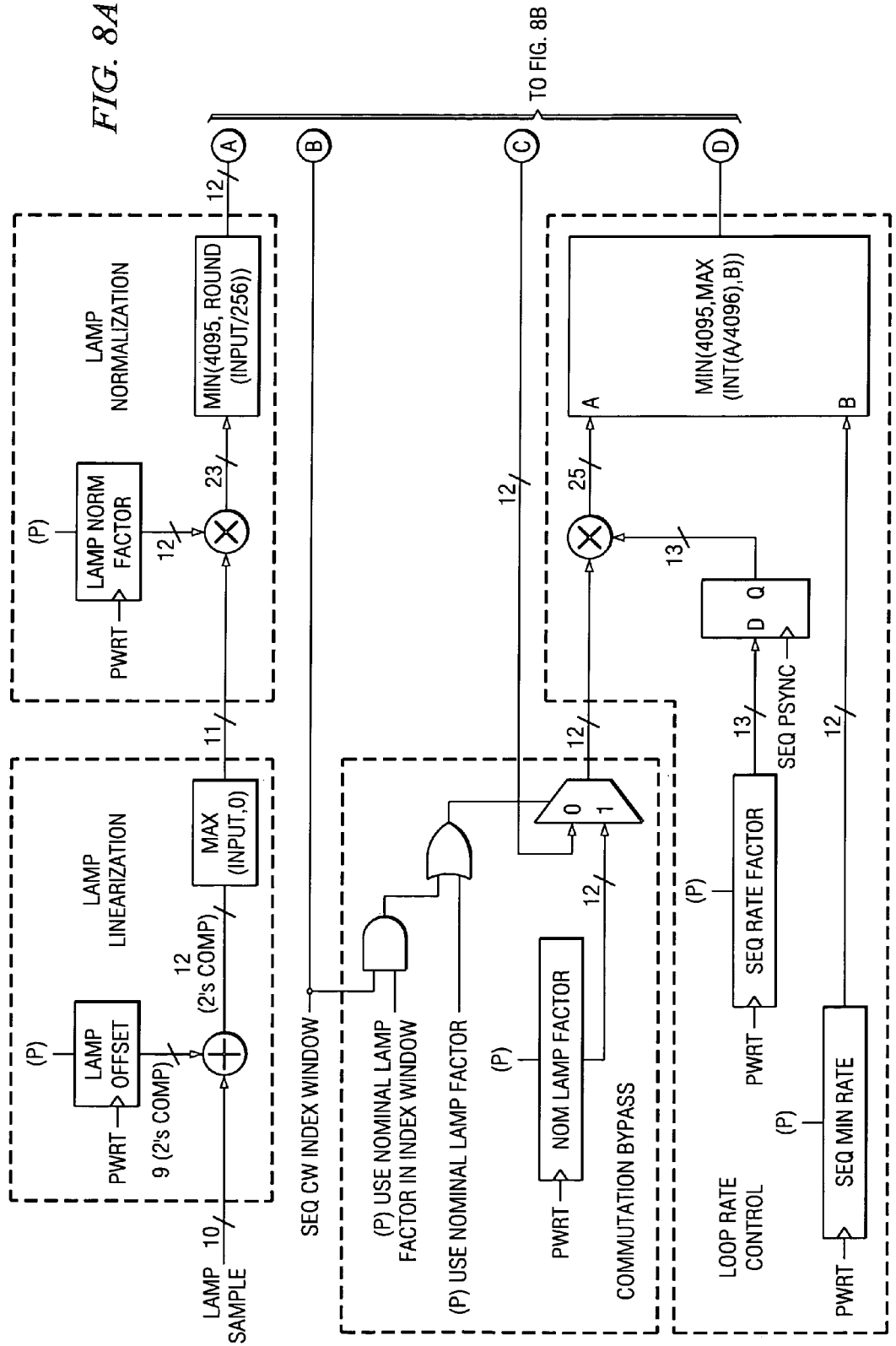
Figure 8B:
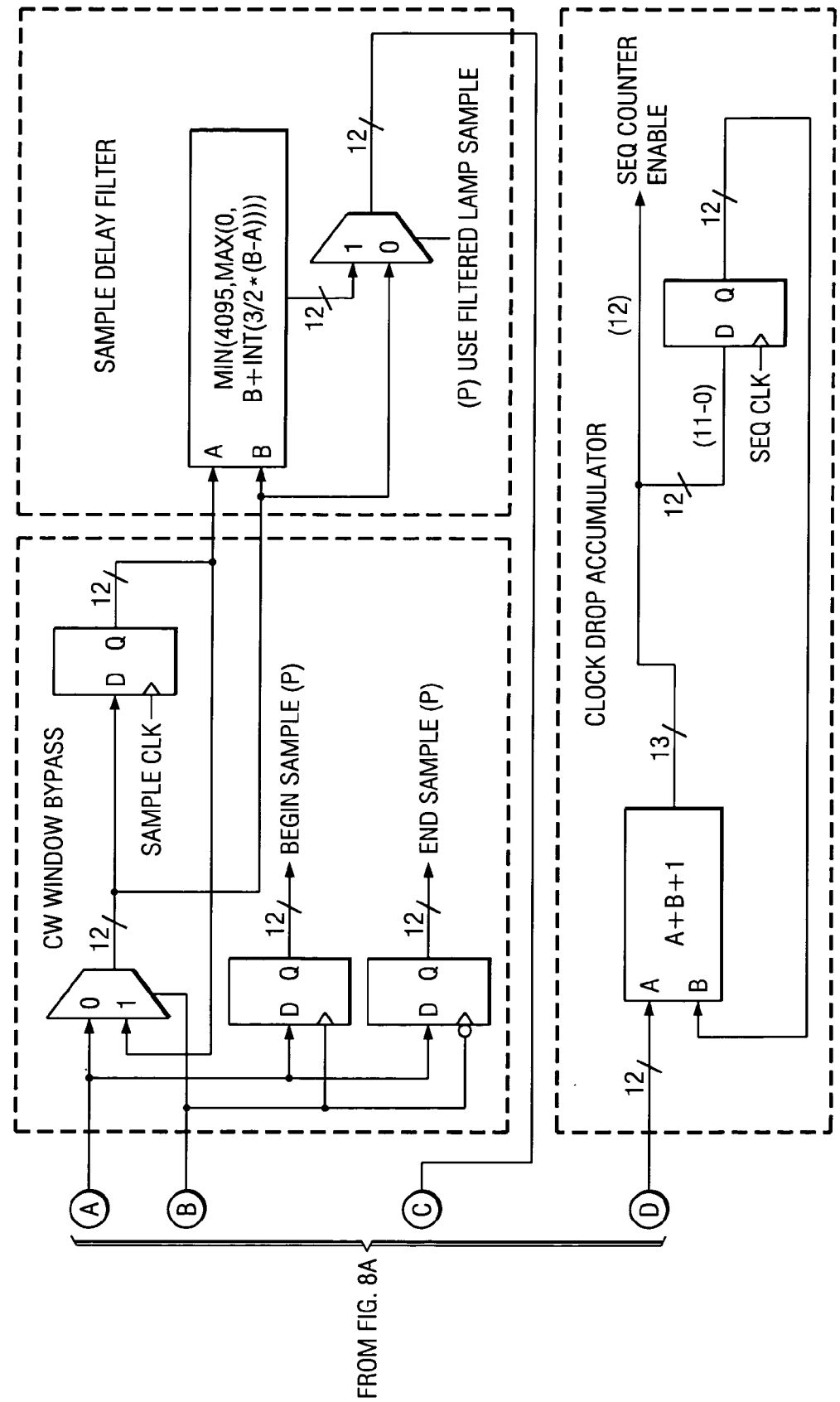

FIG. 7 shows an embodiment index detection and lamp calibration circuit and FIG. 8 shows a clock-dropping generator. These circuits are found within the clock-dropping block 154 of FIG. 5. In this implementation, the clock dropping and lamp sensor functions produce a number of outputs:

CW index—The color wheel index indicates the color wheel timing marks sensed by the lamp sensor.

Min sample value, max sample value—The minimum sample value and maximum sample value signals indicate the minimum and maximum lamp sensor values that are used by the processor to set thresholds for discriminating the color wheel timing marks.

Lamp sample sum—The lamp sample sum is the accumulation over a programmable number of lamp syncs of lamp sensor values taken at the time of each lamp sync. These sums are used to normalize the lamp sensor input into the clock dropping circuit.

Lamp sample incomplete—The lamp sample incomplete signal is read at the same time as lamp sample sum signal and indicates that the lamp sample sum does not include all the lamp samples requested. This signal is an error indicator.

Seq counter enable—The sequence counter enable signal, on each sequencer clock, determines whether the memory and reset instruction timing counters decrement or hold. It controls both the short-term rate at which the sequencer executes and the overall length of the sequence programs. This signal is shown in FIG. 8.

In operation, referring to FIG. 5, a light to voltage transducer 136 senses light from the lamp 110 as seen through the color wheel timing ring (not shown). The transducer 136 is assumed to be linear and zero referenced. The transducer voltage is converted by a 10-bit A/D converter 156 with a sample rate on the order of 1 MHz. The sample clock is typically generated by the integrated circuit that includes the circuitry of FIG. 7. (In the preferred embodiment, this integrated circuit is an ASIC that also includes processor 146, clock dropping circuit 154 and sequencer 148, as well as a number of other circuits). A faster clock may be required (or desired) by the A/D device 156 for serial input. The modulated lamp light samples are assembled in the ASIC at the sample rate.

These samples are used dynamically to adjust clock dropping for the short-term sequencer execution rate to be proportional to the lamp output. The circuit combines the lamp information with an overall sequencer rate factor set to control the sequence program period. This will be described with respect to FIGS. 5 and 7.

The color wheel timing ring (not shown) effectively shuts off the light at certain intervals in each color wheel revolution. The CW index circuit 158 detects these index marks. Lamp inputs to the clock dropping circuit must be ignored during the index mark periods. The CW index circuit 158 includes minimum and maximum detection functions and a thresholding function with hysteresis.

The minimum and maximum detect functions 162 and 164 compare each incoming lamp sample to their stored values and replace their values with the new sample if the new sample is less or more, respectively, than the stored values. The processor 146 can read the stored minimum sample value and maximum sample value at any time. A circuit input (reset min/max detect) sets the stored values to 1023 for minimum detection and 0 for maximum detection. This input could be separately controlled by the processor or could be tied to the reading of the minimum and maximum values.

The processor 146 uses the minimum and maximum values to determine the thresholds for the thresholding function. Two processor writable registers 166 and 168 feed into that circuit, index threshold (high) and index threshold (low). These registers control both the threshold and the hysteresis range. When CW index is not true, the index threshold (low) value is compared to the lamp sample. When the lamp sample goes below that value (light from the lamp is cut off), the CW index goes true. On the next sample and as long as the CW index is true, the lamp sample is compared to the index threshold (high) value. The lamp sample must exceed that value to send the CW index back to false.

The difference (determined by block 170) between the two register values is the margin against noise in the lamp samples. It is expected that there will be a fixed noise margin (H) and a fixed threshold percentage (T) determined for a system. The processor would then compute the thresholds as follows:

index threshold(high)=(max sample value−min sample value)*$T$+min sample value+$H/2$ index threshold(low)=(max sample value−min sample value)*$T$+min sample value−$H/2$ The processor should perform this function at a period $T_{BD}$. The period should be fast enough to detect gradual lamp variations but not so fast to disturb the CW index too often. Obviously, the cycle cannot be shorter than the CW index period. It will probably be required more often at warm-up than after lamp stabilization.

Lamp normalization sampling will now be discussed. In order to normalize the lamp samples for clock dropping, the processor 146 will need to collect samples. The lamp sample accumulator 172 circuit performs this function. When the color wheel 114 and sequencer 148 are properly aligned so that any color wheel index marks are occurring at the expected times, then the lamp samples should show the nominal intensity just before a commutation event. Since the processor 146 cannot be interrupted at every lamp sync and since the samples must be filtered, the circuit accumulates up to 31 samples taken at lamp syncs. The processor 146 programs the number of samples to accumulate by writing the desired number into the 5-bit lamp sample count register.

The accumulation is started by the lamp sample reset signal, which clears the accumulator 172 and the 5-bit sample counter 174. This signal could be under direct processor control or could be actuated from the processor reading the accumulator output. At each subsequent lamp sync, the 10-bit sample value is added to the accumulator 172 and the sample counter 174 increments. When the counter 174 value equals the programmed lamp sample count (stored in register 176), the sample counter 174 is disabled and the accumulator value is held. The comparison is performed by circuit 178.

The processor 146 can read the 15-bit accumulator output (lamp sample sum) at any time. The lamp sample incomplete bit read with the lamp sample sum indicates if the read value includes fewer than the programmed number of samples. This is an error condition. Normally the processor 146 would ask for the number of lamp syncs in one frame (or less) and read the value once per frame.

The processor 146 uses the lamp sample sum in a $T_{BD}$ filtering process that computes a nominal lamp sample value, which in turn is used in the calculation of the lamp norm factor for clock dropping.

Referring to FIG. 8, the clock dropping circuit produces the seq counter enable signal which controls, on each sequencer clock, whether the memory and reset instruction timing counters decrement or not. The average duty cycle of the seq counter enable signal is functionally the product of two fractional (0 to 1) rate factors; one computed by the processor to control the overall sequence program period and the other produced from the lamp sensor samples to control the short-term execution rate.

The lamp rate factor can track the instantaneous lamp intensity only when the light is not being interrupted by the CW timing marks. The lamp rate factor circuit has two features to handle these interruptions.

Whenever the color wheel and sequencer are not locked up and phase aligned, the processor asserts a control bit (use nominal lamp factor) that substitutes the contents of the nominal lamp factor register for the lamp derived factor. In setup, the processor configures the nominal lamp factor register with a value representing the average or nominal operating point of the lamp intensity for that system. When the processor detects that the color wheel and sequencer are locked up, clearing the control bit allows the lamp generated values to be used.

The second feature to handle timing marks requires the sequencer to produce a signal (seq CW index window) that encompasses the time of the expected CW index mark. While this signal is true, the lamp rate factor is held at the last computed value before the signal toggled. When the signal goes back to false, the computed factors are again used. It is expected that the lamp commutations will be positioned so that there is no overlap with CW index marks. Holding the last value should then produce little error.

The dynamic lamp rate factor is the product of the raw 10-bit lamp sample and the contents of the 12-bit lamp norm factor (LNF) register periodically set by the processor. The LNF is computed from the filtered nominal lamp sample value (NLS) from lamp normalization sampling and the expected positive lamp commutation deviation (PCD) expressed as a percentage of the nominal lamp intensity. The PCD is a constant for a particular system design. The formula is:

$$LNF = \frac{2^{20}}{(1+PCD)*NLS}.$$

For example if PCD is 12%, then the calculation is LNF=936228/NLS. The calculation should be performed once per frame.

The 12-bit fractional rate factor produced by the circuit is functionally

Lamp rate factor=MIN(4095, INT(lamp sample*$LNF$/256)).

These formulas allow the dynamic range of lamp sampling to drop as far as one quarter of full scale, i.e., the maximum lamp sample value can drop as low as 256 and stay in range.

The sequence rate factor is set by the processor and written into the 12-bit seq rate factor register. This factor is the output of the sequence rate control loop that measures the overall length of each sequence program and compares it to the color wheel's color cycle period. This factor should be updated once per color cycle.

To synchronize changes in the sequence rate factor, the register output is clocked into the circuit by the seq psync signal, which signifies the beginning of each sequence program.

The rate accumulator circuit produces the sequence counter enable signal to control the speed of sequencer execution. On each sequence clock (seq clk), the circuit adds the 12-bit rate control value to the 12-bit previous sum with an additional 1 carried in and saves the 12-bit sum. When the calculation step overflows, the sequence counter enable bit is true and the sequencer delay counters decrement. No overflow causes the delay counters to hold which effectively drops that clock step and extends the sequence time line by one sequence clock period.

The rate control value is the fractional product of the two fractional rate factors, i.e. the seq rate factor and the lamp rate factor. The arithmetic formula for the rate control value is:

Rate control=INT(seq rate*lamp rate/4096)+1.

The 1 added to the rate control as well as the 1 carried into the accumulator are used to achieve the maximum sequencer rate and cause the sequence delay counters to decrement on every clock irrespective of the saved accumulator sum. This condition will only happen when both the lamp rate factor and the sequence rate factor are all 1's (4095).

The processor performs the sequence rate control loop to produce the value it then writes to the sequence rate factor register once per color cycle. This rate factor will take effect at the beginning of the next sequence program, and the sequence execution rate will be proportional to that factor until the following program start. The period of the next sequence program is thus inversely proportional to the rate factor.

Systems will be designed with multiple sets of sequence programs, each set covering a specific frame rate range. The processor must select the proper set of sequence programs to run in each output frame. The sequence ranges are designed to overlap slightly to prevent unstable operation.

The criteria for switching to a different sequence set can be as simple as comparing the sequence rate factor to predetermined thresholds. If the rate factor exceeds the high threshold, then a switch to the next higher rate sequence set should be initiated. The rate factor going below the low threshold should cause a switch to the next lower rate set.

Great care should be taken whenever the processor determines it is necessary to switch sequence program sets. If two adjacent sequence sets use the same configuration, i.e. all bit, slice, color cycle, etc. parameters are the same, then the new set can be used on the next frame boundary. On the other hand, any change to that affects relative bit weights will require some kind of input data restructuring prior to switching sequence sets, and the switch must be timed to coincide with the availability of the reconfigured frame data. The processor must look up the switching requirements for each sequence set transition and perform the appropriate actions.

If input data reconfiguration is required, there will be at least one frame delay before the sequence can be switched. If the reconfiguration cannot be done "on the fly" (without losing a frame of data), then the last pre-switch output frame must be repeated until the first post-switch data is ready. This means that no buffer swap can be performed until a complete frame of new data is ready.

Whenever the sequence set switch is performed, the sequence rate factor must be simultaneously adjusted for the new program period lengths. The adjustment formula is:

New rate factor=old rate factor*$(F_{old}/F_{new})$ where $F_{old}$ and $F_{new}$ are the maximum frame rates supported by the old and new sequence sets, respectively.

For example, suppose a system has one sequence set with a 62 Hz maximum frame rate and the next higher rate set has 85 Hz maximum. When switching from the 62 Hz set to the 85 Hz set, the rate factor must be multiplied by 0.7294. When switching the other way, multiply by 1.3710. The new rate factor then becomes the basis for subsequent adjustments to the sequence rate.

Embodiments of the present invention expand upon the clock-dropping concepts provided in U.S. Pat. No. 5,912, 712. One difference of the preferred embodiment clock dropping and the style described in the '712 patent is that the controlled sequence rate is directly proportional to the input factor(s). The old clock dropping circuit was a "drop 1 of N clocks" implementation, which is an inverse control.

One advantage provided by the new style is greatly improved rate resolution. As the desired sequence rate moves away from full speed, the old method would take larger and larger rate steps which made it effectively unusable for any significant slow down. For instance, changing one step from N=10 (9/10 full rate) to N=9 (8/9 full rate) would slow down by 1.23% or over 100 μs in a half 60 Hz frame. The old method can be improved by adding a second factor to make smaller steps but deriving this new factor is conceptually and computationally difficult.

The preferred embodiment method goes in 1/4096 of full speed steps all the way to (almost) zero. An advantage is then to have fine rate control over a wider range, which allows a single sequence program to cover more frame rate variation and still end at the right time. This degree of control is also useful to having a free-running sequence.

Another advantage of the preferred embodiment is the use of proportional control. Because the rate is directly proportional to the input, the loop control process is simplified to multiplying the desired rate by a constant to set the sequence rate factor. This proportionality is also the feature that allows the lamp rate factor to be included in hardware with a simple multiplier. Attempting to do this with the old style would have been much more difficult.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments described in the specification.

What is claimed is:

1. A system for controlling timing signals for a spatial light modulator-based display, the system comprising:
   a sequencer having at least one spatial light modulator timing signal output, the sequencer also having a sequencer index signal output; and
   a processor having a first input coupled to receive a video synchronization signal, a second input coupled to receive a color cycle index signal, and a third input coupled to the sequencer index signal output of the sequencer, the processor running a first control loop that locks the color cycle index signal to the video synchronization signal, the processor also running a second control loop that locks the sequencer index signal to the color cycle index signal.

2. The system of claim 1 and further comprising clock dropping circuitry that includes an input to receive a clock dropping output signal of the processor and an output coupled to a clock dropping input of the sequencer, wherein a clock dropping signal provided to the sequencer is based upon the clock dropping output signal of the processor and the timing of a spatial light modulator timing signal provided at the spatial light modulator timing signal output of the sequencer is based upon the clock dropping signal provided to the sequencer.

3. The system of claim 1 wherein the sequencer comprises a free-running sequencer.

4. The system of claim 1 wherein the video synchronization signal comprises a VSYNC (vertical synchronization) signal.

5. A method of controlling the timing of a spatial light modulator, the method comprising:
  receiving a video timing signal;
  generating a spatial light modulator timing signal based upon the video timing signal;
  determining the timing of a color wheel;
  comparing the timing of the color wheel with the timing of the spatial light
  modulator timing signal; and
    based upon the result of the comparing, adjusting the spatial light modulator timing signal.

6. The method of claim 5 wherein the spatial light modulator timing signal is adjusted by clock dropping.

7. The method of claim 6 wherein the spatial light modulator timing signal is adjusted by fixed steps.

* * * * *